United States Patent Office 3,799,744
Patented Mar. 26, 1974

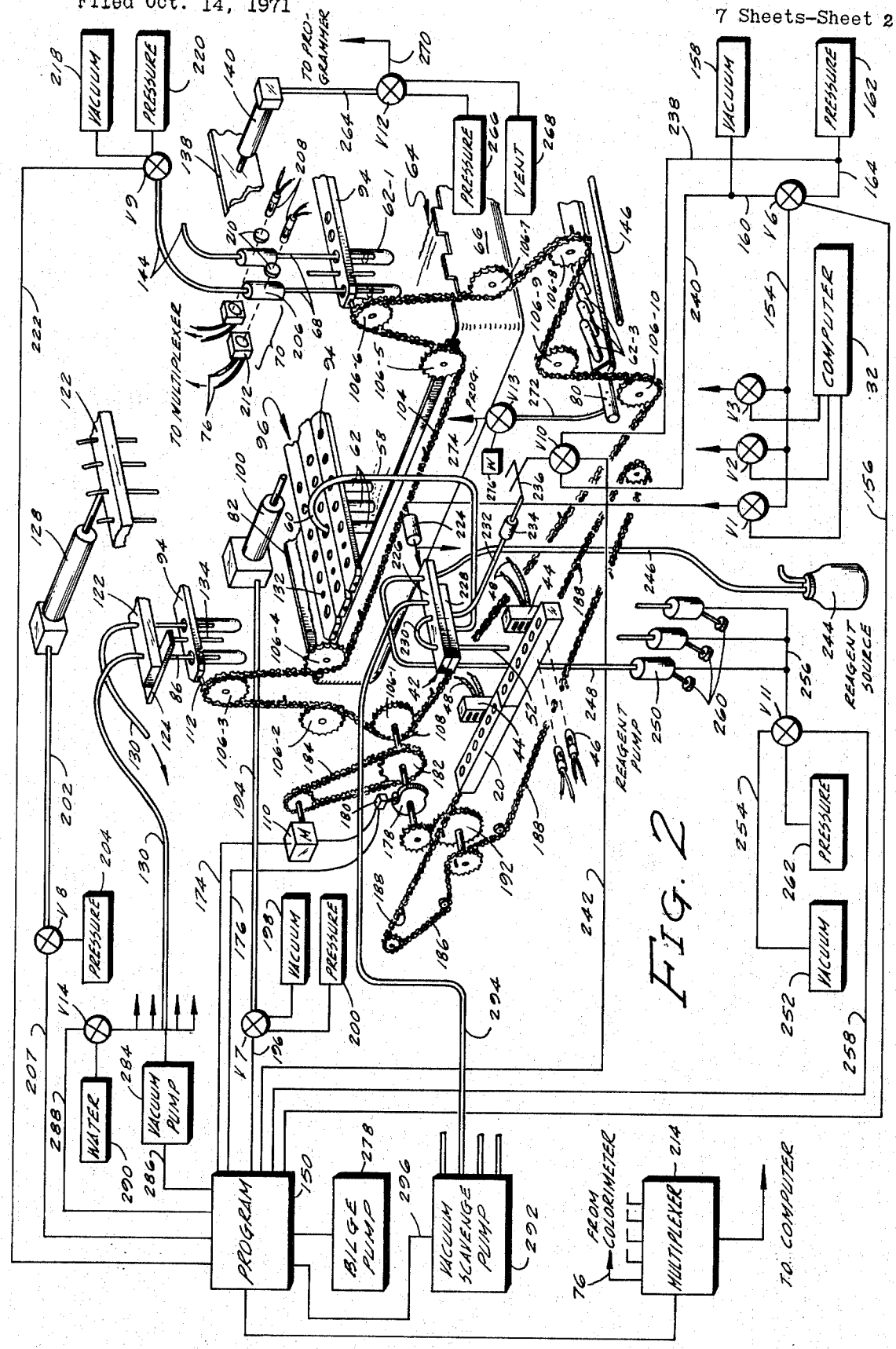

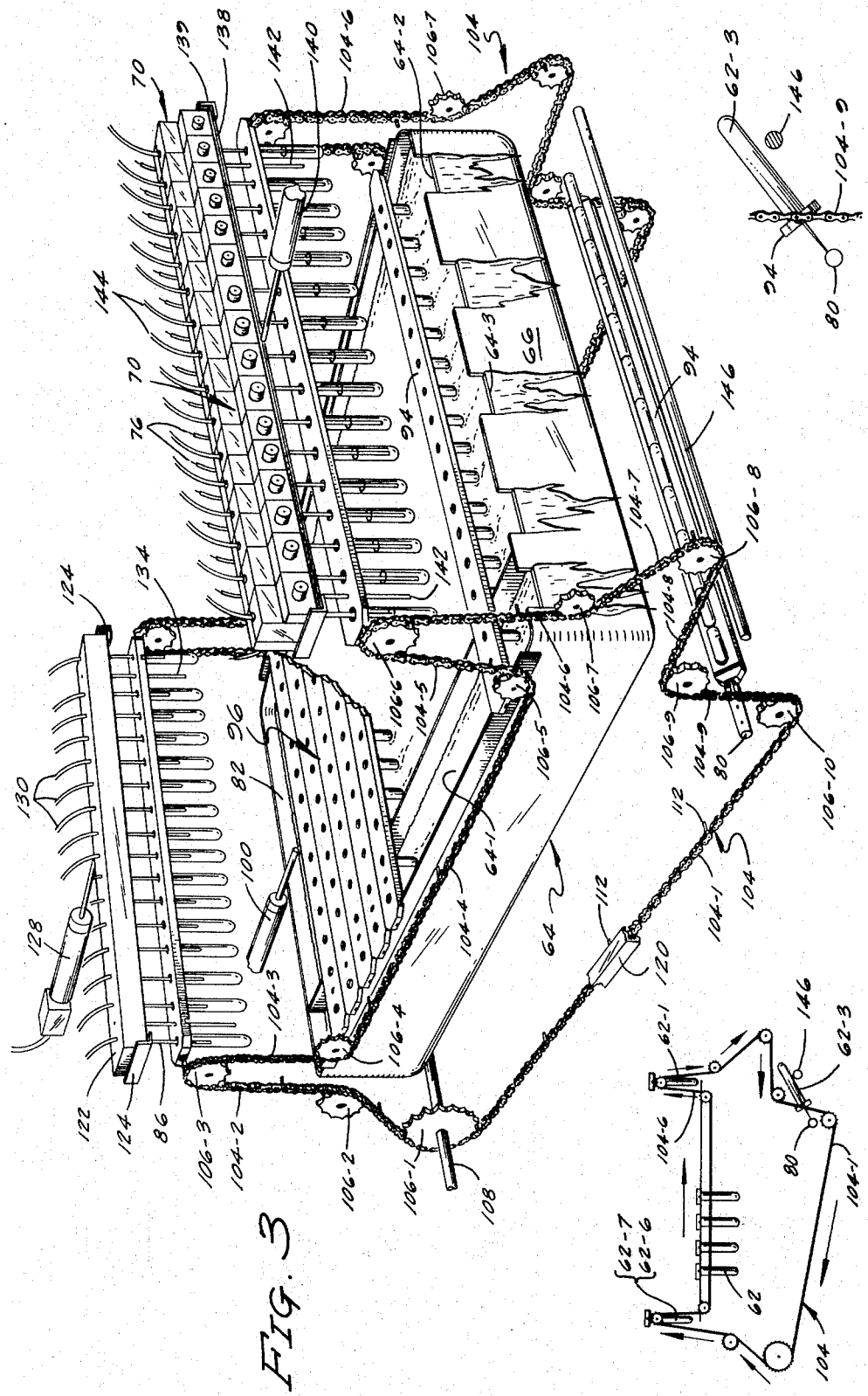

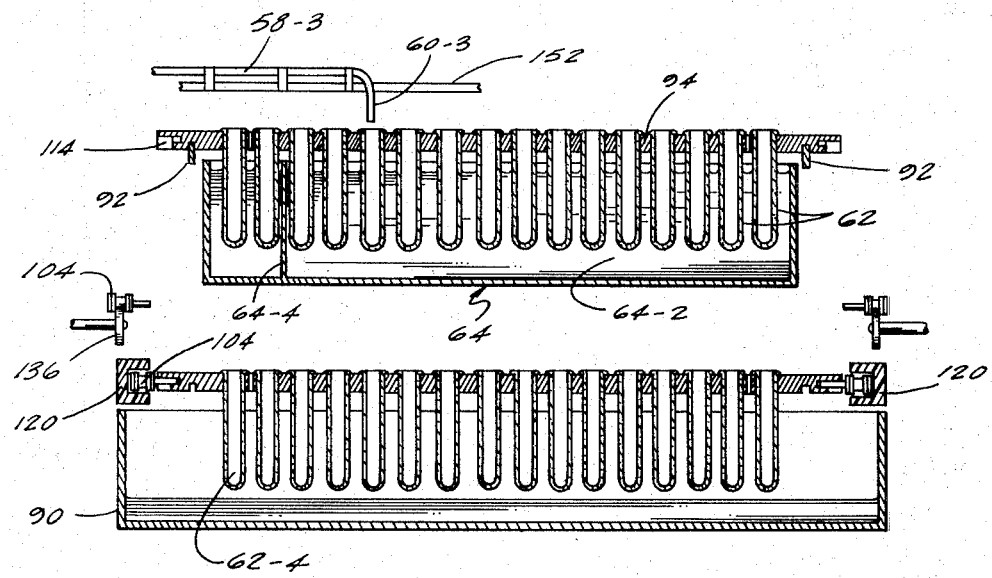
FIG. 9
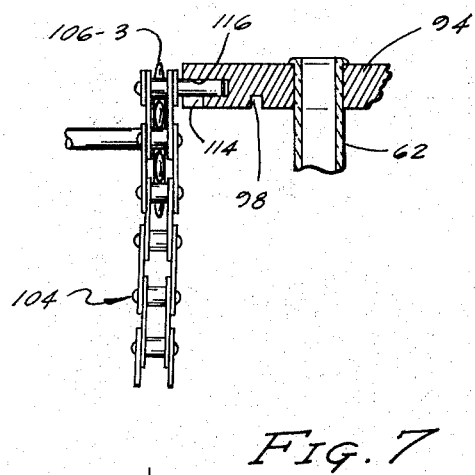
FIG. 7
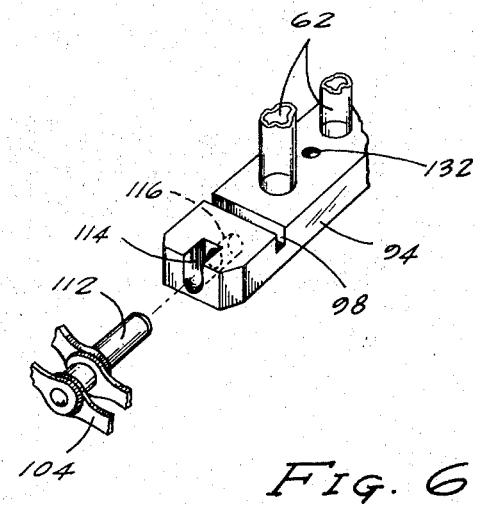
FIG. 6
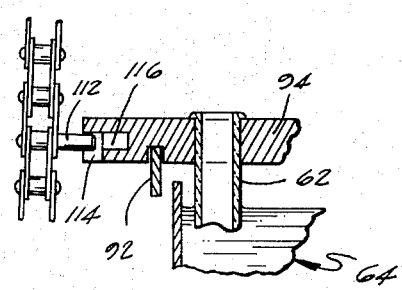

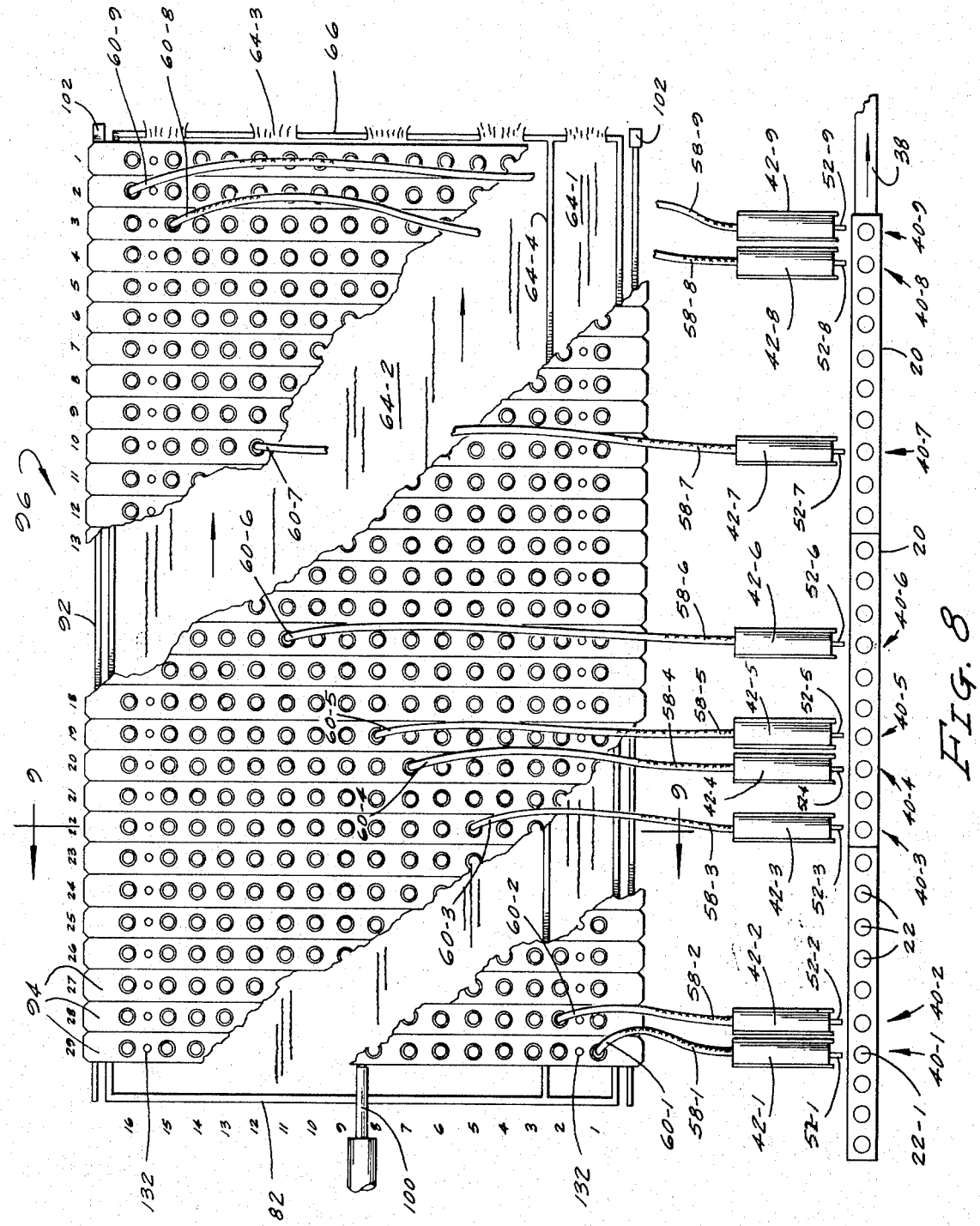

3,799,744
AUTOMATIC CHEMICAL ANALYSIS APPARATUS
Alan Richardson Jones, Miami, Fla., assignor to Coulter Electronics, Inc., Hialeah, Fla.
Filed Oct. 14, 1971, Ser. No. 189,092
Int. Cl. G01n 1/14
U.S. Cl. 23—253 R         31 Claims

ABSTRACT OF THE DISCLOSURE

Automatic chemical analysis apparatus including a plurality of sampling heads operable to withdraw samples from sample cups in a sample cup holder, to mix the samples with reagents and then to deposit the samples in specific reaction tubes carried by beams in a bath. The sampling head includes a probe and a valve mechanism. An operating mechanism functions to move the probe and simultaneously operate the valve mechanism. The beams are oriented with respect to the sample cup holders and moved in synchronized relationship with the beams whereby a sensing device can sense and correlate indicia on each holder with tests performed on the samples in the reaction tube in the beam related to that holder. The beams are moved through the bath from an entrance end to an exit end thereof by a ram and are moved into and out of the bath by chains mounted on sprockets. The chains move the beams and tubes from the exit end past a colorimeter station where colorimetric tests are performed. The results of the tests and the indicia sensed are fed to a computer which processes them and which provides a printout of the results with identification of the source of the sample obtained from the indicia. After the colorimetric tests have been performed, the beams are transported by the chains underneath the bath to the entrance end during which transporting the tubes are emptied, washed, rinsed and dried.

BACKGROUND OF THE INVENTION

The field of the invention herein is concerned with apparatus which is intended automatically to make a plurality of chemical tests on a series of individual samples which are fed to the apparatus.

Such apparatus is generally known in the art, one of the most important applications of the same being in the medical field. For the purposes of lucidity and ease of understanding the invention, it will be described in detail embodied in apparatus for use in the medical field, but it should be understood that the invention is not so limited.

In the medical field, for diagnostic and routine informational purposes, and often for research, certain chemical tests are performed on samples of whole blood or blood serum. Often physical tests are additionally performed on the samples. Classically all such tests were performed manually by trained technicians in laboratories. In a typical chemical test, the patient's blood would be drawn, spun in a centrifuge to separate the serum from the cells, the serum decanted and placed in a container suitably identified with the patient's identification data. The technician would then measure out a small quantity of serum into a reaction tube, mix the serum with a precise proportion of some chemical reagent, mix this thoroughly, place the reaction tube in a water bath maintained at some precise temperature and time its presence, i.e. incubation, in the bath in accordance with the type of test being conducted. This incubation period is sufficient to achieve a certain chemical reaction which will change the color of the diluted specimen. Then the technician would remove the reaction tube from the water bath, pour a quantity into a cuvette, direct a beam of light at some predetermined wavelength through the cuvette and measure the absorbance of the light in the solution in the cuvette. This latter operation could be performed in a spectrophotometer or other colorimeter.

Over a period of years, these chemical tests have developed to a relatively high degree of acceptance to ascertain such information as the total protein of the blood; the presence of certain chemicals such as phosphorus, potassium, sodium, and calcium; the amount of creatinine in the blood; the amounts of different enzymes, albumin, etc. Laboratories may perform as little as one or two tests on the available specimen or as many as twenty. The reagent composition, the proportions, the incubation time, the temperature of incubation time and the wavelength of the incident light passed through the end solution vary from test to test. Certain problems are inherent in the manual execution of these tests by technicians and the obviation of these problems is the end sought by most automated or semi-automated automatic chemistry apparatus.

Among the problems associated with manual performance of these tests are the likelihood of human errors promoted by the measurements which must be made manually, the need for entering information and data relating to the sample and keeping its identification straight, tediousness and fatigue of the technician, errors in choosing the proper chemicals and the failure to keep the equipment clean of contamination. Other disadvantages in the classical methods are loss of time, expense, waste, etc.

The known automatic chemical analysis apparatuses solve the above problems for the most part in varying degree, although not all apparatuses solve all problems. These apparatuses take different forms. Among the structures are some which utilize samples placed on turntables that rotate to a sample withdrawing position. At the sample withdrawing position, the samples are diluted and passed to the processing poriton of the apparatus. In one form of apparatus, the diluted samples are passed through conduits one after the other, separated by quantities of diluent and bubbles. In other systems, the diluted samples are carried in reaction tubes on continuous drums or conveyors.

Known automatic chemistry analysis apparatuses have problems, the solutions of which have made such devices complex, expensive, overly large in size and in some instances likely to produce erroneous results. Of importance in the problems are patient identification and contamination. Some of these equipments are continuous and require that all tests be performed on all samples. The invention herein provides for selective performance of tests and hence is economical.

An important feature of the invention is the manner in which the reaction tubes are moved before, after and during the incubation period. Another important feature is the maintenance of patient identification with relation to tests, test results, etc.

The several advantages of the invention will be more particularly pointed out as a description thereof proceeds.

SUMMARY OF THE INVENTION

The invention is embodied in automatic chemical analysis apparatus in which a plurality of chemical tests is adapted to be performed on a plurality of samples, each sample being capable of having any one or more of all of the plurality of tests performed on it.

The invention is described by reference to samples of blood serum from respective patients adapted to be subjected to a plurality of chemical tests leading to colorimetric determination of the results of such tests. The invention is not limited to such specific use but is applicable as well to chemical testing generally where the type of samples and the processes to be executed are compatible with the apparatus of the invention.

Each test is basically performed by mixing a small quantity of serum sample with a specific volume of a reagent to start a chemical reaction that leads to the production of a sample solution capable of colorimetric analysis. The reaction is incubated for a specific length of time at a predetermined temperature before the colorimetric measurement is made and the measurement itself is conducted utilizing a specific wavelength of light that is classically employed for the particular test. The measurement comprises ascertaining the optical absorbance of the diluted and incubated sample in a suitable cuvette. The derived data is processed to obtain the test results in proper units.

Serum samples from individual patients are deposited in the sample cups of cup carriers and at the same time the address of all information related to each individual sample is established in accordance with an identifying number permanently associated with the cup carrier at the location of the particular cup. For example, each carrier has ten cup cavities permanently marked with a machine readable code that establishes a different number or character for each cavity. When the sample is deposited in any specific cup, the number of that cup or cavity is entered into the memory of a computer and all other information relating to the sample is also entered. The cup identification number or character then becomes the address in the computer for all information and data relating to that patient. The patient identification data, the type of test (whether standard, blank or actual test) may be entered at the time and the specific kind of tests to be selectively performed on this sample is also entered in the computer memory.

The carriers are then placed on a rectilinear guideway where they can be translated along a line relative to a plurality of sample withdrawing stations. Each station is associated with one particular kind of test and there is a sample aspirating and diluting head at each station. Reading devices along the path of movement of the carriers sense the position of each cup of any carrier when a particular sample withdrawing station is reached and call upon the memory of the computer to ascertain whether the original instructions commanded the specific test individual to that sample withdrawing station to be performed. If the instructions were not to make the specific test, the cup will pass the station without the sample aspirating head operating. If the instructions are to make the test, the sample aspirating and diluting head will be operated to aspirate a small quantity of serum from the cup and dilute it with the reagent individual to that particular chemical test in a precise proportion to achieve a diluted sample ready to be incubated.

The diluted sample is deposited by the aspirating head in a reaction tube carried by a rack or beam in such a way that the bottom end of the reaction tube is immersed in a constant temperature water bath. Thereafter, the beam is moved while remaining in the bath to a reading station in the time period which depends upon the location of the beam at the time the deposit was made. The desired chemical reaction takes place within the reaction tube in the meantime. At the reading station, a quantity of the diluted sample from the reaction tube is drawn into a cuvette and the colorimetric measurement is made to ascertain its absorbance at a certain wavelength of light, this data being passed to the computer and processed to be entered as results in the store associated with the particular patient information. Again, the address is that of the character on the carrier alongside the sample cup, the apparatus being constructed to read the address from the carrier at the time the colorimetric measurement is made or to ascertain the proper address from one or more previous readings made. In this latter case, the computer will count back from the reading station to the last position of the specific cup when its indicia was read and identified and uses that information for the address of the data derived from measurements taken.

The apparatus has a plurality of the beams described, each being an elongate, narrow racklike member with a plurality of reaction tubes set into holes formed along the length of the beam and protruding from the bottom thereof with the mouths open to the top of the beam. Each beam has as many reaction tubes mounted thereto as there are different types of tests to be performed. An array of beams is arranged to slide sideways along a pair of rails which is disposed over a water bath which is large enough to accommodate the bottom ends of all the reaction tubes which depend from the beams of the array. The beams are parallel one to the other and touching. A pneumatic ram pushes the entire array sideways periodically in accordance with the predetermined program of operation of the apparatus.

Each beam is individual to a single serum sample and is spatially related to the sample cup containing the sample. The movement of each beam as it slides sideways is synchronized with the movement of the carrier which holds the sample cup containing the serum sample that is related to that beam. In this way, the spatial relationship between beam and sample cup is always maintained. As the sample cup individual to a specific beam is carried past the sample withdrawing stations, the sample heads selected by the computer for that particular serum sample will aspirate a small quantity of serum sample and make the chemical dilution with reagents for the various tests. Each sample withdrawing station is in a different location along the line or path of movement of the carrier and beam, the location in every instance being chosen on the basis of the incubating time for the particular test being made. Thus, when a sample cup arrives at a given sample withdrawing station, its beam arrives at the discharge nozzle of the sample withdrawing and diluting means at that station. The discharge nozzle being fixed, the location of the reaction tube receiving the diluted sample will always be the same for each beam thereby forming a row of reaction tubes normal to the long dimensions of the beams and parallel with the direction of movement of the array of beams. There will be as many such rows as types of tests which can be made, and each sample aspirating and diluting means will have its discharge nozzle arranged to discharge chemicals into the reaction tubes of only a single row.

To review, each beam will carry diluted samples derived from a single serum sample. The beams are arranged in an array side by side, thereby forming rows of reaction tubes. Each row relates only to a single type of test, but the individual reaction tubes of the row will contain dilutions from the respective serum samples being tested.

As stated, the array of beams is supported on rails with the bottom ends of all tubes immersed in a water bath. Usually there will be more than one incubating temperature, hence, there will be more than one bath. In the practical example, there were two elongate troughs beneath the array and side by side so as to provide the needed incubating temperatures without interfering with movement of the reaction tubes through the bodies of water in the respective troughs or to require beams other than symmetrical in construction. The combination of troughs will be called "water bath" hereafter. A pair of parallel driven sprocket chains suitably guided and confined for looped movement is configured in relation to the length of the beams and the arrangement of the array such that pins located at spaced positions along the chains can engage in grooves or pockets provided in the ends of the beams or withdraw therefrom. The confining and guiding means direct the chains to lift a beam disposed at the end of the array up from the rails and out of the forward end of the water bath, to carry the beam below the water bath to the rear end of the water bath, to lift the beam up above the water bath and to deposit it on the rails again with its reaction tubes once more dipping into the bath.

Thus, a particular beam starting at the rear end of the water bath is lifted from below the bath and deposited on the rails at the rear of the array in the space left by the entire array having just previously been pushed forward by the pneumatic ram. Each time the ram operates it pushes the entire array a distance equal to the width of a beam. Just before the array is pushed forward, the end beam at the forward end of the water bath is lifted off the rails leaving a space into which the next beam will move as the remainder of the array is pushed. This same process continues during the operation of the machine, and as will be obvious, the particular beam mentioned above starts at the rear of the water bath and works its way through the array toward the front of the water bath, moving forwardly step-by-step. For each step, one beam is removed from the front of the array and one beam is added to the rear of the array. The time required for a particular beam to move fully through the array depends upon the total number of beams making up the array, and the time for the beam to move from the center of the array to the front of the array depends upon its location relative to the number of beams in the array.

For example, assuming that each step of beam movement takes a minute, if there are twenty-nine beams in the array, it will take twenty-nine minutes for the most recently added beam to reach the last position on the rails, this being the reading station. All of the lower ends of the reaction tubes of that particular beam will have been in the water bath for the complete time, but not all of the tubes will contain incubating solutions for the entire time. The sample withdrawing stations will be discharging solutions for their respective tests at different stages of movement of the particular beam along its path of travel and hence the times of incubation for the different reaction tubes will differ. The tests which require long incubating times have their sample aspirating stations toward the rear of the array and those that require lesser times are disposed closer to the reading station depending upon the desired incubating times.

If, for example, there are sixteen tests which can be performed, there will be sixteen sample aspirating stations and sixteen rows of reaction tubes. Each beam will therefore have sixteen reaction tubes riding partially immersed in the water bath. Any given beam may have from one to sixteen of its reaction tubes used during a complete run, depending upon the instructions from the computer for the particular serum sample. All tests are completed at the same time when the beam carrying the reaction tubes for the particular serum sample reaches the reading station.

A diluted sample discharged into a reaction tube of a beam that is thirteen beams from the reading station will have been incubated thirteen minutes when that beam arrives at the reading station.

In the process of lifting the last beam from the rails, out of the water bath and carrying it down below the water bath to be returned to the rear end thereof, the beam is lifted upwards toward a cross arm carrying a line of sixteen different colorimeters, each including a test cuvette, a source of light of some predetermined wavelength and a photosensitive device. The test cuvette has a probe and is connected with a pneumatic system which enables sample solution to be sucked up into the cuvette, measured colorimetrically to ascertain its absorbance and discharged back into the reaction tube. All sixteen tubes are thus moved simultaneously and all solutions are measured simultaneously. Obviously, if any of the reaction tubes do not have solutions, there is no measurement made which produces useful results.

Thereafter, the beam is tilted over a fixed bar and the contents of all reaction tubes emptied, after which a water manifold shoots jets of water into the reaction tubes to rinse them. The waste flows into a large receptacle below the water bath. The sprocket chains carry the beam back toward the rear of the water bath, raise it to a position where it can be once more filled with rinse water and the water sucked out by suitable nozzles that operate at the meniscus of water in each tube. Further movement carries the beam to the position described at the rear of the array, with all of its reaction tubes cleaned and dried.

The beams are coupled to the sprocket chains when they leave the array and uncoupled from the sprocket chains when they join the array by means of the converging and diverging of the chains, respectively, occurring at the forward end of the array and the rear end of the array.

BRIEF DESCRIPTION OF THE DRAWINGS

FIG. 2 is a diagrammatic view of the apparatus of the invention showing the relationships between the various elements and used in explaining the operation thereof;

FIG. 3 is a fragmentary perspective view of the incubator transport system of the apparatus of the invention;

FIG. 4 is a simplified diagram illustrating the paths taken by the sprocket chains in moving relation to the water bath;

FIG. 5 is a fragmentary detail showing the manner in which the beams are tipped to dump the contents of the reaction tubes and thereafter washed by jets of water;

FIG. 6 is a fragmentary bottom perspective view of one end of a beam showing the groove and journal thereof;

FIG. 7 is a fragmentary detailed view showing how the beams are coupled to or uncoupled from the moving chains;

FIG. 8 is a top plan view, somewhat diagrammatic in nature to illustrate the array of beams and the relationships between the beams, the sample cup carriers and the sample aspirating heads;

FIG. 9 is a sectional view taken generally along the line 9—9 of FIG. 8 and in the indicated direction;

DESCRIPTION OF THE PREFERRED EMBODIMENT

As previously mentioned, the invention is described in detail herein in connection with an apparatus embodying the same which is specifically intended for conducting blood chemistry tests upon blood serum. This is only by way of example, since the invention equally may be applied to systems where the samples comprise liquids that are to be reacted with reagents for testing the liquids. The tests could be conducted for quality control, index measurement, identification, routine surveillance and the like in any of many fields of industry and medicine. The apparatus might be utilized in extensive research projects requiring plural chemical tests of a multiplicity of samples.

The measurements which are made according to the embodiment described are colorimetric and hence the reading station will be described as including a plurality of colorimeters. The invention is not so limited. It is feasible in apparatus which is used for other than colorimetric determinations to have other types of measurements made on the finally incubated diluted samples. Instead of measuring absorbance, suitable means could be used to measure conductivity, pH, turbidity, etc.

The apparatus of the invention may take many different forms and structures. Components and groups of components may be housed in many cabinets or large consoles or may be mounted on panels alone and with other equipment. The practical embodiments of the invention were housed in several cabinets constructed with suitable framework and support members. In order to illustrate the invention as clearly as possible, practically no support, housing or framing structure has been illustrated, but it should be obvious that the various components and parts must be carried in fixed relation to one another and in a manner that will protect the operators from moving parts and corrosive reagents. For the most part conventional cabinetry and framework may be used for housing and supporting the apparatus for esthetic appearance purposes also.

Figure 1:
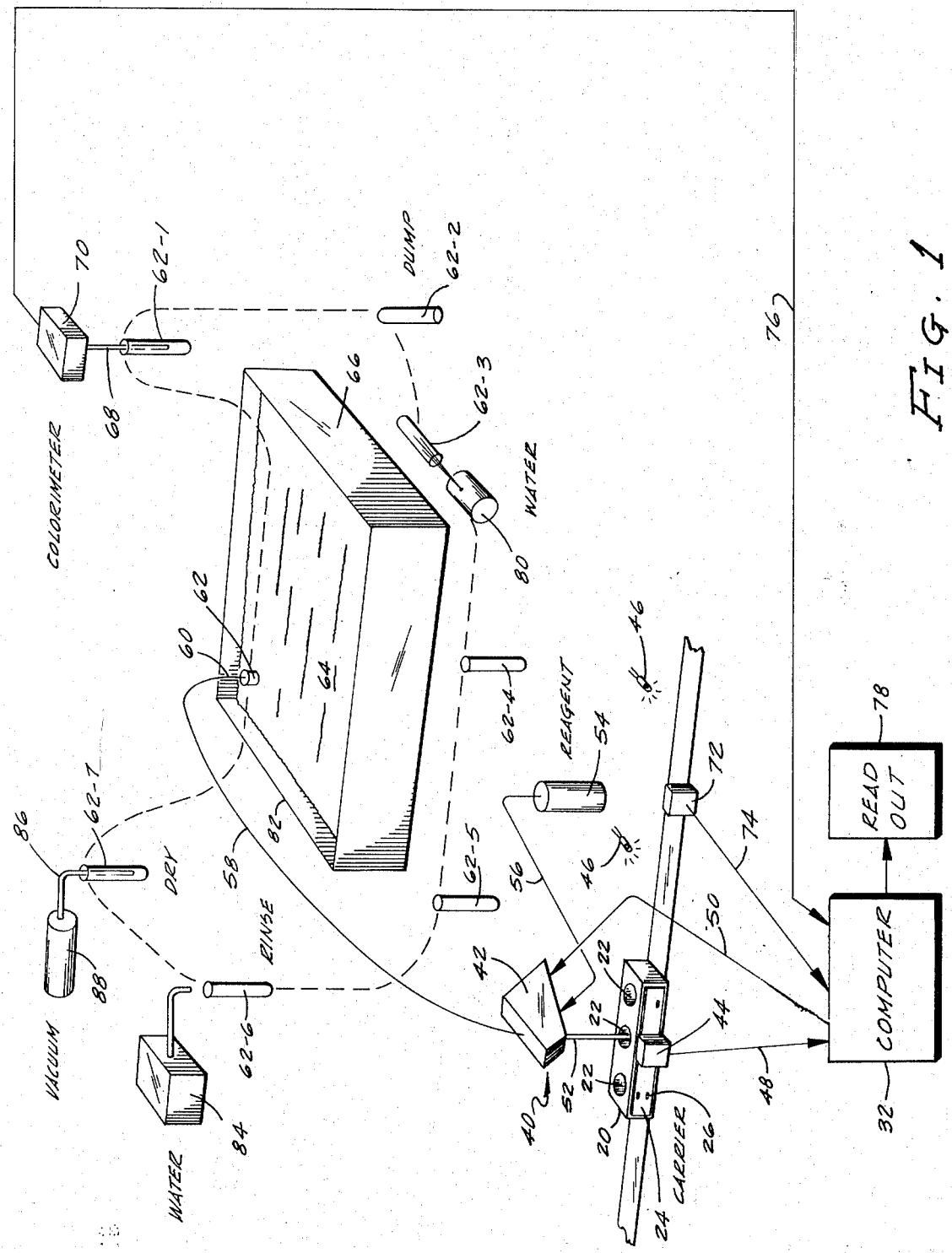
FIG. 1 is a diagrammatic view of a system constructed and operating in accordance with the invention, being shown in its most simplified form.
Figure 10:
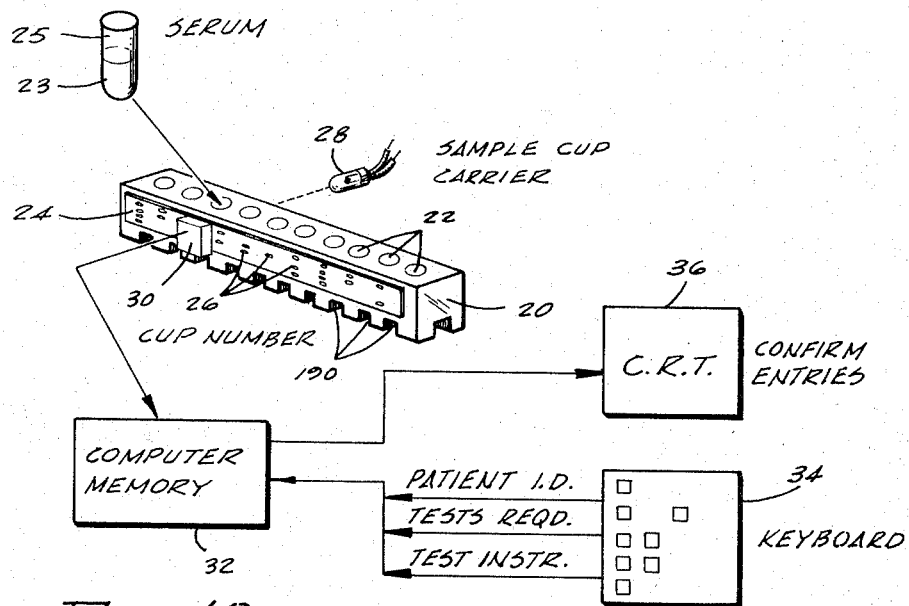
FIG. 10 is a block diagram showing the manner in which a sample carrier is loaded and the information relating to the same stored in the computer memory.

An understanding of the basic structures and operations may be obtained at the outset by referring first to FIGS. 1 and 10.

In FIG. 1 a carrier is illustrated at 20. The carrier 20 is provided with a plurality of cavities along its length, equally spaced apart and spaced from the ends by half the distance between cavities so that two carriers end to end will provide a continuous line of cavities all equally spaced apart. Each of the cavities contains a sample cup 22 and each sample cup is adapted to carry a quantity of blood serum 23 (FIG. 10) therein which is individual to a single patient. Although the sample cups 22 are separable from the cavities, no effort will be made hereinafter to identify them separately, it being assumed hereafter that there is a cup in every cavity. The block forming the carrier has an opaque strip 24 adhered to one side surface thereof and the strip 24 has a character indicia 26 along its length directly opposite each sample cup to identify that particular cup. In a practical example, the strip was of metal and hence opaque. The character indicia 26 in every case was formed by punching or drilling holes in the metal to produce a different number for each sample cup by binary code. Thus, once a sample cup was placed in a cavity, it assumed the indicia character 26 individual to that cavity and carried the said character as its address through the testing period.

The character could be read electronically by an array of photoresponsive devices, such as photodiodes, when light transmitted from the opposite side of the carrier 20 passed through the holes of the binary code and energized the photoresponsive devices. In FIG. 10, a light 28 is shown disposed to illuminate the side of the carrier 20 opposite that side that carries the plate 24 and thereby to pass through the openings in the plate 24 and selectively impinge on selected photoresponsive devices of an array contained in the electronic reader 30.

When the sample cup carrier 20 is loaded, it preferably is placed in a form of loading apparatus (not shown) that is connected with the memory of a computer designated 32 in FIG. 10. The carrier preferably is moved into a tunnel which has an opening on the top thereof and which exposes only one cup 22 at a time. The electronic reader 30 is aligned with the hole so that it is reading the character individual to the cup 22 when the cup is exposed. When the operator places the serum sample 23 in the cup 22 that is exposed by pouring same from a container such as shown at 25, the character is already being transmitted to the computer memory 32. At this time, the operator may also operate one or more keyboards, diagrammatically indicated at 34, to transmit information to the computer memory including the complete patient identification, the identifications of the different tests that are to be made on the particular sample of serum, and information as to the nature of the test. In this latter respect, means conveniently may be provided for running standards and blanks in addition to carrying out the regular testing procedures.

Conveniently, a cathode ray tube terminal 36 driven by the computer enables the operator visually to verify all of the information being transmitted to the computer 32. When all of the information is entered and stored at a suitable command signal available under the control of the operator, thereafter the only address required for all of this information consists of the character represented by the indicia 26 that was aligned with the sample cup 22 when the sample cup 22 was being filled.

From the loading apparatus, the carrier 20 is placed in operative relation to the test performing apparatus which will be described. In FIG. 1 the progress of a sample in a single cup 22 is followed. The carrier 20 moves in a guideway 38 which carries the cups 22 in operative relation to a sample aspirating station 40 where there is a sample aspirating and diluting head 42. The construction of this head could generally be similar to those of U.S. Pats. Nos. 2,867,355 and 3,567,390. The position of any cup 22 opposite any one of the plurality of stations 40 is sensed by one or more electronic readers such as shown at 44 along the length of the guideway 38. There is a plurality of lamps 46 disposed to illuminate the carriers 20 so that the photoresponsive devices of the readers 44 may be energized.

The address of the particular cup 22 that is at the sample aspirating station 40 is sensed by the computer 32 through a line such as shown at 48 and the computer 32 advises the sample aspirating and diluting head 42 whether it is to draw a sample or not. The intervening line 50 may include interfacing drivers, valves, pneumatic apparatus and the like and the head 42 is driven in operation by structure not shown in FIG. 1. If the head 42 is to aspirate a sample, the probe or snorkel 52 is dipped down into the cup 22, shown in FIG. 1 as the center cup. A small amount of serum passes into the head 42 where it is diluted with a specific proportion of reagent drawn from a container 54 by way of the line 56. The exact structure includes a pump which is adjustable as to transmitted volume and connections to pneumatic lines which are not shown in FIG. 1.

The resulting diluted sample is transmitted by a conduit 58 to a nozzle 60 that discharges it into a reaction tube 62 whose bottom end is immersed in the water bath 64, the temperature of the water being maintained by suitable well-known means.

From this point, the tube 62 travels a path that is described in very simple terms in connection with FIG. 1. The tube 62 moves to the forward end 66 of the bath 64 along the broken line shown and is thus incubated for the time that it was in the water bath 64. At the front end 66 of the bath 64, the tube is lifted to the position 62–1 where it is aligned with the probe 68 of a colorimeter 70. The incubated diluted sample is now sucked into a cuvette within the colorimeter, its absorbance measured and the sample discharged back into the tube 62 positioned at 62–1. The carrier 20 in the meantime has been moving along the guideway 38 in synchronism with the movement of the tube 62 in the water bath 64 so that when the front end 66 is reached, the carrier 20 has positioned the sample cup 22 adjacent another electronic reader 72 that is so located to advise the computer 32 through line 74 that the absorbance of the diluted sample from the specific cup is being measured. This latter information, transmitted by way of the line 76 enables the computer 32 to receive and process the results from the colorimeter 70 and relate them to the cup 22 by virtue of the address of that cup. As previously explained, the address comprises the character represented by the indicia 26 carried on the plate 24 in alignment with the cup. The computer 32 will perform the necessary computations to convert the colorimeter reading to proper units of chemical information and then transmit this latter data to a readout device 78 which, at the same time, identifies the patient and data of all other tests performed on that same serum sample contained in the same cup. Although only one test from one reaction tube is shown, it is to be understood that during the movement of the sample cup carrier 20 along its guideway 38 a number of other tests is being performed, using additional heads like 42 located at additional stations like 40 discharging into additional reaction tubes like 62 and measured by additional colorimeters like 70. All colorimeter measurements are performed at one time and transmitted by lines like 76 to the computer, with intervening multiplexing means having terminals scanned to keep the data properly classified.

Instead of a readout device 78 or in addition thereto, the output data may be stored in a separate store of the computer 32 or in the memory of another computer for recall, verification, statistical purposes and so on. The readout device 78 may print the data and/or display the same. Preferably, all readout functions and subsequent storage are carried with patient identification exclusive of the character address carried by the sample cup carrier 20, so that the computer 32 may be programmed to erase this address and enable the operator to utilize the same sample cup carrier 20 for tests of subsequently acquired serum samples of other patients.

After the colorimeter 70 has measured the absorbance of the sample in the reaction tube 62 at the position 62–1, the transport system of the apparatus moves the tube 62 downwardly to the position 62–2 at which location, the tube is inverted and its contents dumped into a suitable waste receptacle. The tube 62 continues to move, now starting to pass under the front 66 of the water bath 64, and at the position 62–3 it is canted into alignment with the water jets of a pressure water manifold 80. These jets are preferably pulsing in nature to wash the tube 62 thoroughly. Thereafter the tube 62 continues to move along the broken line through the positions 62–4 and 62–5 at which the tube may once more have been erected. After leaving the position 62–5, once more the tube 62 commences to be lifted around the rear end 82 of the water bath 64 to the position 62–6. Here there is provided another source 84 of water which is directed to fill the tube 62 while at the position 62–6. The reaction tube 62 is next moved to position 62–7 at which location a fine cannula 86 connected to a source 88 of vacuum is inserted into the tube 62. The cannula 86 moves inwardly relative to the tube 62 and in the process sucks from the tube the water which had been placed there at position 62–6. The operation is conducted from the surface of the water downward so that the cannula 86 is drawing up the meniscus of the water, thereby thoroughly drying the interior of the tube 62.

In the practical device, the positions 62–6 and 62–7 are substantially the same and the sources of vacuum 88 and water 84 are both connected to the cannula 86 and alternately operated.

After being dried, the tube 62 is now ready to receive a new diluted sample and hence it is transported to a position at the rear end 82 of the bath 64 with its lower end immersed in the bath. Thereafter, it moves along a straight line in the bath and will be filled with the diluted sample at the position shown at 62. This completes the cycle.

Other tubes will follow the identical bath described and pass through the same procedure and be filled at the location 62 by the nozzle 60 but with diluted samples from other cups. Additional tubes moving on parallel paths will be filled at different locations along the length of the water bath 64 depending upon how long it is required that their reactions incubate.

Attention is now invited to FIGS. 3, 4, 5, 6, 7, 8, and 9 to explain additional details of the incubator-transport system of the apparatus of the invention.

A practical example of the apparatus of the invention was constructed utilizing a water bath 64 that had two separate troughs containing the individual baths 64–1 and 64–2. The former was maintained at a temperature of 100° C. and the latter at a temperature of 37° C. The baths were separated by a partition 64–4 and suitable controls and a flow system were incorporated, none of the latter being illustrated since same are well-known. The front wall 66 is notched at the top edge thereof as shown at 64–3 to provide an overflow, with the water dropping into a waste receptacle 90 disposed below the bath 64. A pair of elongate narrow rails 92 is fixed to the framework (not shown) of the apparatus, spaced above the bath 64, one rail being disposed alongside each of the side walls of the bath 64.

The reaction tubes 62 are carried on beams 94 as explained, with the major portion of each tube protruding from the bottom of a beam, the mouth opening on the top of the beam. The beams are elongate metal racklike members, all being of the identical construction and each holding the same number of tubes. In FIG. 8 an array of such beams is shown at 96. This array is formed of a plurality of beams 94 arranged edge to edge and parallel one with the other. In all, there are twenty-nine beams illustrated, and for convenience, the beam positions are numbered in FIG. 8, starting at the front end which is on the right. The movement of the beams, as will be explained, is from left to right. Each beam 94 has sixteen reaction tubes and considering the tubes form rows extending in the direction that the beams move, that is, horizontally in FIG. 8, these rows are numbered 1 to 16, starting with the row at the bottom of the view. In locating any reaction tube during the discussion, the beam number and row number will provide an exact placement thereof.

Each beam has a groove 98 cut in the bottom surface thereof spaced inwardly from each end. The spacing between grooves is equal to the spacing between the rails so that when a beam is deposited on the rails with its grooves aligned with the rails, endwise movement is prevented but the beam is capable of being slid sideways. The rows 1 and 2 of reaction tubes are aligned with the bath 64–1 and hence will always be subject to incubation at a temperature of 100° C. or to whatever temperature at which the bath is maintained. All of the other rows of reaction tubes have their lower ends immersed in the bath 64–2 and hence these tubes are maintained at a temperature of 37° C., in the example being described.

In the operation of the device, the right-hand beam No. 1 is in the read position. It will be lifted from its rest position on the forward end of the rails 92 in a manner to be described, to be raised to the position shown in FIG. 3 with the reaction tubes designated as 62–1. This leaves a space where the beam No. 1 was. The pneumatic ram 100 now operates and engages the left-hand edge of beam No. 29, pushing it and the entire array 96 to the right along the rails 92 until the No. 2 beam engages against a pair of stop members 102 provided at the right-hand end of the rails 9. Thus, the space left by the beam No. 1 is now occupied by beam No. 2 and all other beams have moved forward accordingly. Assuming that it takes one minute for each cycle of the apparatus, and that there is one movement of a beam one space for each cycle, it would take beam No. 29 twenty-nine minutes to get to the position occupied by beam No. 1 in FIG. 8 against the stop members 102.

Since the array 96 has been pushed to the right, there is a space left at the left-hand end of the rails 92, and the transport system deposits another beam carrying the normal complement of reaction tubes on the rails 92 in the position formerly occupied by the beam No. 29, adding the new beam to the array.

This action continues, with the reaction tubes moving forward in the baths 64–1 and 64–2 toward the right-hand end 66.

In order to accomplish this kind of action through the use of continuously circulating chains which move at a speed much greater than the speed of the array in its sliding movement to the right, an arrangement is used which can coupled the beams to the chains and uncouple them from the chains at the proper times. There is a pair of sprocket chains 104 which is suitably guided to accomplish the purpose. The chains are continuous and are positioned alongside the bath 64 spaced therefrom in a manner to be described. In FIG. 3, the chain 104, all of which can be seen in the view, is guided by a plurality of sprockets 106–1 to 106–10, the direction of movement being as indicated by the arrows. The sprocket 106–1 is driven by the shaft 108 that in turn is driven by a suitable motor 110 (FIG. 2). The various reaches of the chain 104 are illustrated at 104–1 to 104–9. Both chains have inwardly extending pins 112 spaced along their lengths at equidistant positions and accurately located between the chains 104.

The beams 94 are provided on their lower surfaces with downwardly opening grooves 114 aligned with the long axis of each beam, these grooves being only at opposite ends of each beam. Each groove 114 terminates in a socket 116 forming a journal. If a pair of pins 112 of the opposite chains is spaced apart a distance which is less than the distance between the entrances to the journals 116 and the pins are engaged in the journals 116 of a beam 94, the chains 104 will carry the beam 94 with movement of the chains regardless of the rotative disposition of the beam. If, on the other hand, the distance between the pair of pins 112 is greater than the distance between the entrances to the journals, but still less than the distance between the ends of the beam, then if the beam is aligned with a pair of pins 112, movement of the chains will carry the beam with it although the pins are only engaged in the grooves 114 of the beam. The beam 94 is, however, capable of being lifted off the pins or placed upon the pins even while the chain is moving. This may be termed uncoupling and coupling the beam relative to the chain 104.

In the course of movement of the beams 94, as explained above, the array 96 has the front beam removed, is pushed forward and then has a new beam deposited at its rear as a part of the array. This is done by proper arrangement of the chains 104. When the beams are carried along the reach 104–1 which is below the bath 64, the reaction tubes being as shown in FIG. 1 in pisitions 62–4 and 62–5, the distance between the pair of chains 104 is such that the pins 112 engage fully into the journals of the beams 94 being carried. To preserve this spacing, the chains 104 are suitably guided along most of the reach 104–1 by guide members 120 on opposite sides of the bath 64 and considerably below the bath. The guides 120 may be in the form of grooved members or idler rollers arranged closely together along the length of the chains 104 with the chains taking tortuous paths back and forth over the idlers. The purpose of this guiding function is to prevent the beams 94 below the bath 64 from falling off the chains 104 by maintaining the proper spacing between the chains.

The chains pass over the sprockets 106–1 and are guided to a vertical movement along the reach 104–2 by the sprockets 106–2 and 106–3. It will be appreciated that this will commence to lift the beam 94 that is carried by the pins of the chain at that reach 104–2. As the beam 94 is raised along the reach 104–3, a crossarm 122 which is slidable along suitable guideways 124 (FIG. 2) is aligned with the beam so that all of the cannula 86 mounted on the crossarm 122 are aligned with the respective reaction tubes 62 of that beam. The position of the crossarm is adjusted on the upward movement of the beam by the pneumatic ram or cylinder 128 controlled to pull the crossarm to the left as viewed in FIG. 3 from a previously achieved position. The programming of the apparatus is arranged so that the beam stops just before the cannula 86 enter the reaction tubes carried by the beam. The tubes are now in the position identified as 62–6 in FIG. 1. The conduits 130 connected with the cannula 86 are now in turn connected with a source of rinse water and each of the reaction tubes is filled with water. The chains 104 then move once more and the beam 94 moves upwardly. Guide holes 132 engaged with guide rods 134 carried by the crossarm 122 to ensure that the beam will be perfectly aligned with the cannula 86 while this occurs. As the beam 94 rises, the conduits 130 are now connected to a source of suction and the water in the reaction tubes 62 is sucked out. By the time the beam reaches the position shown in FIG. 3 when the tubes are at location designated 62–7, the reaction tubes are dry.

At this point, as the beam passes over the arc at the top of the sprockets 106–3 the guide rods 134 carry the crossarm 122 slightly forward, the cylinder or ram 128 having in the meantime been vented to permit this. The distance between pins holding the beam at this point has been substantially the same as the beam was passed around the bottom of the bath 64 and raised. It should be appreciated that the reaction tubes were thereby raised above the top of the bath 64 and since the centerline of the sprockets 106–3 is placed in vertical alignment with the wall 82 of the rear of the bath 64, the tubes will now be poised directly above the bath where before they were spaced slightly to the rear of the bath 64, this occurring as the beam passes over the arc of the sprocket 106–6.

The reach 104–3 is not perfectly vertical, but, as shown in FIG. 9, is divergent outwardly. From the time that the chains 104 leaves the sprockets 106–3 until they engage with the sprockets 106–4, the distance between them increases so that by the time the beam has been carried downwardly to the rails 92, the pins 112 holding the same have been withdrawn from the journals 116 but still support the beam 94, being engaged in the opposite grooves 114 of the beam. When the beam engages the rails 92 at the rear ends thereof, the chains 104 will continue to move, carrying the pins away from the beam and thus uncoupling the beam from the chains. The beam 94 is now free of the chain and becomes a part of the array 96.

The chains 104 now pass to their reach 104–4 alongside of the bath 64, their wide spacing being maintained by guide means 136 during their movement to the front of the bath. Since there are no beams connected to the chains during the movement along the reach 104–4, simple guide means in the form of a few idling rollers may be used.

When the front of the bath 64 is reached, the chains 104 pass around the idler sprocket 106–5 and the pins 112 engage into the grooves 114 of the beam that is resting in the No. 1 position on the rails 92. The beam 94 will be carried upward along the reach 104–5 and while doing so the chains are now directed to converge by reason of placement of the sprockets 106–6 closer together than the sprockets 106–5. A crossarm 138 carrying a plurality of colorimeters 70 is poised in position by means of a cylinder or ram 140 that moves the crossarm to the left as viewed in FIG. 3 from a previous position, so that the hollow probes 68 depending from the colorimeters 70 will engage in the respective reaction tubes 62 of the beam being raised. Again, the crossarm 138 has guide rods 142 that engage in the guide holes 132 of the beam 94 to assure alignment and enable the crossarm 138 to follow the movement of the beam as it passes over the upper arc of the chains moving around the sprocket 106–6. Movement of crossarm 138 is on guides 139 (FIG. 4).

The upper position of the beam after leaving the No. 1 position of the array 96 is designated 62–1. The hollow probes 68 suck a quantity of the sample solutions out of the reaction tubes into cuvettes carried on the interior of the respective colorimeters 70. The colorimeters 70 include respective sources of light of specific wavelengths which are directed through the cuvettes and respective photosensitive devices respond to the light to give electrical currents indicative of the absorbance of the respective solutions. This information is transmitted to the computer 32 as explained, by lines 76. The liquid was sucked into the colorimeter cuvettes by means of the conduits 144 connected to a source of vacuum and then expressed from the cuvettes by connecting the conduits 144 to a source of air pressure. The expressed liquid passes back into the respective reaction tubes from which the same were originally withdrawn.

The beam carrying the latter reaction tubes now passes to the front reach 104–6, still maintaining the closer spacing of the chains and thus having the pins 112 fully engaged in the journals. The chains pass around the sprockets 106–7 carrying the beam with the reaction tubes along the reach 104–7 forwardly and downwardly. After passing around the sprockets 106–8 the chains carry the beam along the reach 104–8 with the reaction tubes hanging downwardly. The tubes now engage a bar 146 and are forced to tip with the rotation of the beam to the position shown in FIG. 5, dumping the contents of the tubes into the waste receptacle 90 below the bath 64. Thereafter, the chains pass over the sprockets 106–9 and are aligned with the water sprays emerging from a water manifold 80 suitably located at this point. The sprays are preferably pulsed to give a thorough washing to the reaction tubes which drain and pass along the reach 104–9 to the bottom sprockets 106–10 when they are erected and pass onto the reach 104–1.

This completes the description of the circuit of the beams 94. Obviously, the chains 104 will make many circuits in the time that it takes a beam to work its way through the array 96. The apparatus is capable of being simplified and made compact due to the arrangement which couples the beams to the chain to carry them around the bottom of the bath 64 to the rear thereof and then uncouples the beams so that they may be deposited on the rails 92 once more to form a part of the array 96.

The manner of charging the reaction tubes will now be described.

The carriers 20 move as shown in FIG. 8 to the right along their guideway 38 in synchronism with the movement of the array 96. When a sample aspirating station 40 is reached, there is a sample aspirating and diluting head 42 at that station that operates as described to suck up a quantity of serum, dilute it with a suitable reagent and deposit the resulting solution in a reaction tube.

The sample aspirating stations are designated 40–1 to 40–9 in FIG. 8, but there will normally be sixteen such stations, one for each row of tubes. The stations are spaced along the guideway 38 in accordance with the type of test each is to participate in. The resulting dilution is to be deposited directly into a reaction tube which will be incubated for a period of time depending upon how long it takes for the beam carrying the tube to reach the reading position which is position No. 1.

Thus assume that sample aspirating station 40–1 is intended to provide the sample solution for a test which must be incubated in a 100° C. bath for twenty-nine minutes. The head 42–1 is operated by the programmer 150 (FIG. 2) to dip its probe 52–1 into the cup 22–1 which is aligned with the head 42–1 at position 40–1. At the same time, the beam No. 29 is also aligned with the position 40–1. There is a conduit 58–1 connected with the head 42–1 and having a discharge nozzle 60–1 disposed to discharge its output into the reaction tube 62 of row No. 1 of the beam at position No. 29. Every beam that comes along after this is done will have the same dilution made in the head 42–1 with the particular serum sample that is in the aligned cup 22–1 and this diluted sample solution again will be deposited in the reaction tube of row No. 1. It can be understood from the above, that the discharge nozzle 60–1 serves only the reaction tubes of row No. 1.

If the progress of this reaction tube of row No. 1 and beam No. 29 is followed to the right, it will be seen that it takes twenty-nine minutes for the beam to reach position No. 1 and hence the solution will have incubated for that length of time after which it is drawn into the colorimeter 70 aligned with row No. 1 to have its absorbance measured.

Now for the moment, assume that for the patient whose blood serum is in specific cup 22–1 it was decided that the test represented by aspirating station 40–2 was not to be made. The programmer 150 will not be able to operate the head 42–2 under such circumstances, and hence as the array 96 move, what was beam No. 29 has now moved to be in alignment with station 40–2. It now is in position No. 28. The nozzle 60–2 of 58–2 is now aligned with the very same beam that received the discharge from nozzle 60–1, but this time the nozzle is positioned over the reaction tube of row No. 2.

As the beam continues to move to the right, so the cup 22–1 is moved to the right, the cup and its beam being aligned with the sample aspirating stations as the stations are reached. In this manner, a diluted sample could be deposited at station 40–3 in reaction tube of row No. 5 of the same beam, this tube being in bath 64–2 at a temperature of 37° C. At this point, the original beam which was aligned with cup 22–1 in the first place is now in position No. 22 and it will be incubated for twenty-two minutes until it reaches position No. 1. If samples are drawn and diluted and deposited at stations thereafter, they will be deposited in different rows as follows: station 40–4 makes it deposit in row No. 7; station 40–5 makes its deposit in row No. 8; station 40–6 makes its deposit in row No. 11; station 40–7 makes it deposit in row No. 12; station 40–8 makes its deposit in row No. 15; and station 40–9 makes its deposit in row No. 16. The position of the original beam that was at position No. 29 when the first deposit was made at station 40–1 moves along with cup 22–1 and is aligned with each station as the deposit is made.

When position No. 1 has been reached by the beam 94 individual to cup 22–1 its reaction tubes will carry sample solutions made at the several stations using different reagents, but in every case the serum which has been intermixed with reagent came from only one cup, in this case 22–1.

While this process is occurring, other cups are passing along the guideway 38 in alignment with their respective beams, and dilutions are being made from those cups and deposited in the reaction tubes of each cup's beam.

The nozzles from the respective sample aspirating stations are shown located to serve the different rows, and each serves one row and one row only. The conduits from the respective heads are supported in their positions by suitable bracing means. In FIG. 9 the conduit 58–3 and its nozzle 60–3 are supported by a brace 152 spaced above the array 96 and secured to the framework or housing supporting the apparatus.

Each head 42 will provide the proper reagent and proportional dilution for only one test so that it is not necessary that the head perform its function for each serum sample. To do so where not necessary would be wasteful. The apparatus is arranged to command the heads to perform only when the information stored in the computer and related to the particular serum sample calls for the test which is individual to that head. The sequence of operation of the parts of the head and its overall operation with respect to the apparatus must be synchronized with the operation of the other components of the apparatus. Accordingly, the programmer 150 always programs every head 42 to operate, but the computer 32 either permits the head to operate or disables it. This can be done with apparatus that is shown diagrammatically in FIG. 11.

Figure 11:
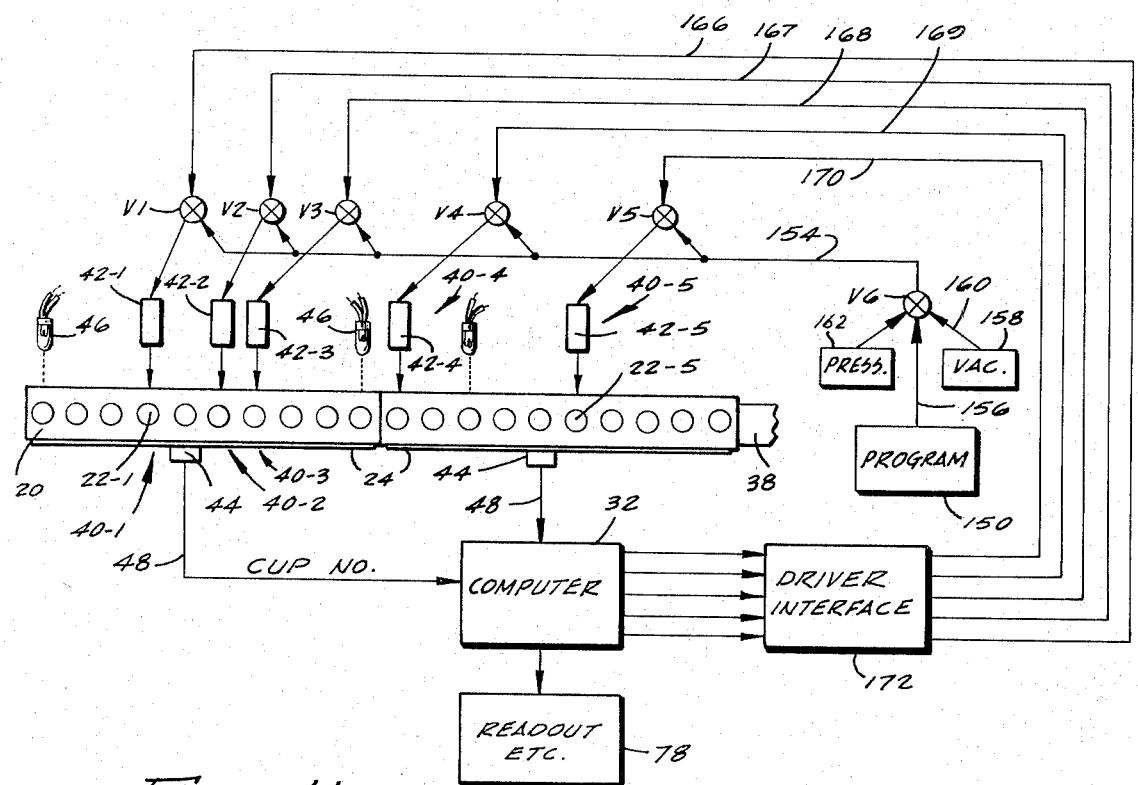
FIG. 11 is a block diagram illustrating the operation of the computer in choosing the tests which are to be conducted for the samples.

In FIG. 11, the carriers 20 move to the right as viewed in the figure along their guideway 38, bringing the respective cups 22 into alignment with the stations and their heads. Five stations 40–1 to 40–5 are shown with the respective heads 42–1 to 42–5. At a given point in the operation of the apparatus, the cups 22–1 to 22–5 are aligned with the respective heads 42–1 to 42–5. The electronic readers 44 and their connecting lines 48 to the computer 32 identify and establish the locations of all of the cups 22, including those aligned with other stations 40. The computer 32 has been instructed which tests to make and hence which heads are to operate on each sample. All of the heads are connected to valves which provide the necessary pressure and vacuum to the valves, but these valves are controlled by the computer. Thus, valves V1 to V5 are connected between the lines L1 to L5 respectively and the manifold 154 which is connected in turn to the valve V6. The valve V6 is operated by the programmer 150 through the line 156 which may operate the valve electrically or pneumatically or hydraulically. As a matter of fact, all the valves in the apparatus may be so operated, but electrical control is most convenient. The valve V6 extends either to a source of vacuum 158 by the conduit 160 or to a source of air pressure 162 by the conduit 164. Each of the valves V1 to V5, respectively, is connected by the lines 166, 167, 168, 169 and 170 to a driver interface 172 which in turn is controlled by the computer 32. When a test is to be made by a particular head 42 on a sample in a sample cup 22, the computer 32 senses the address of the serum sample in the cup 22, refers to its memory to ascertain whether the test was programmed, and if it was, operates the driver interface on the particular line electrically to operate the valve and connect the head to the manifold 154 to fall in with the operation of the valve V6.

Figure 12:
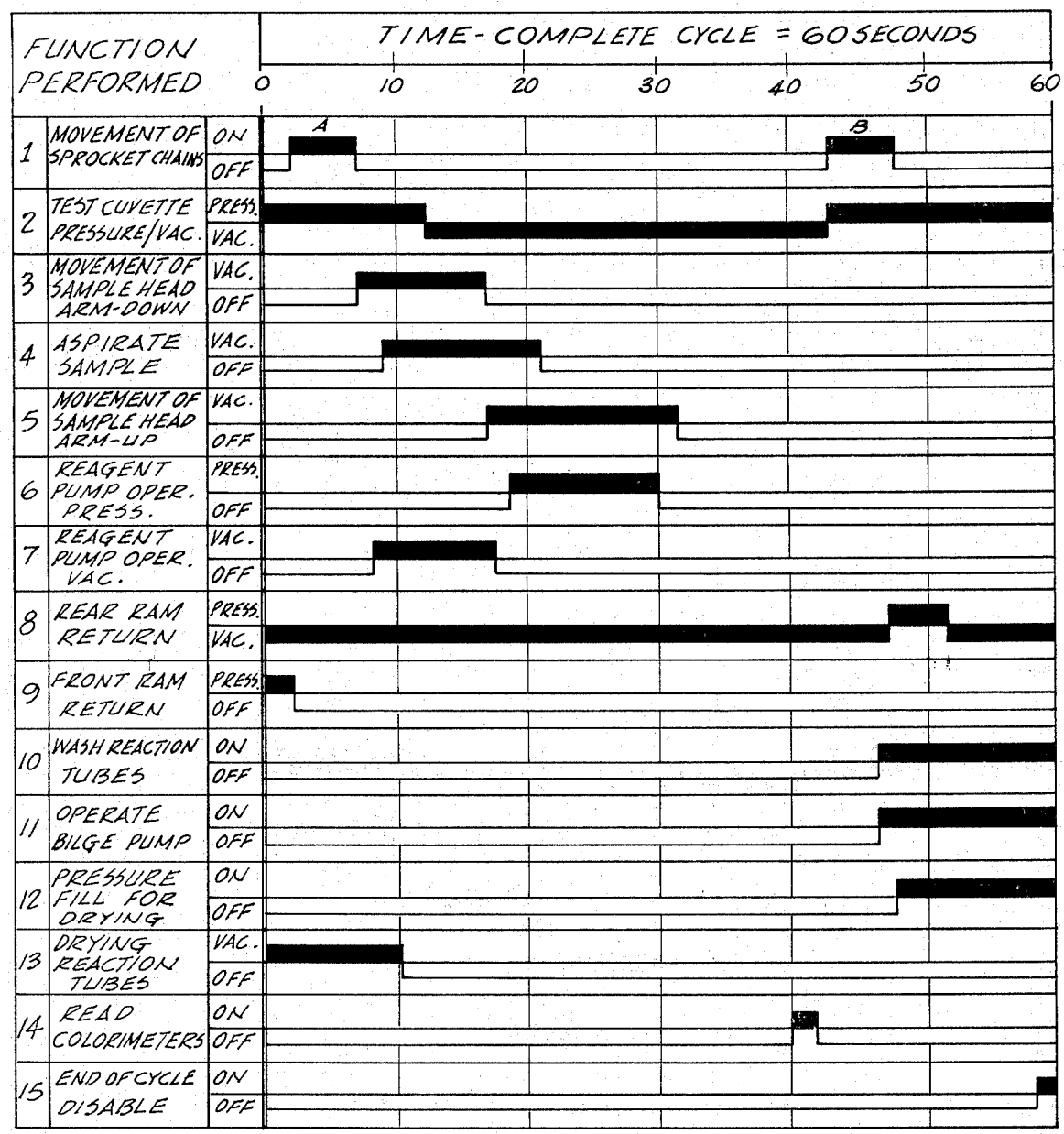
FIG. 12 is a bar chart showing the programmed operation of the apparatus of the invention for a complete cycle.

Reference may now be had to FIGS. 2 and 12 for the programmed operation of the entire apparatus.

FIG. 2 is highly diagrammatic in form and omits many of the details of construction which are not essential to an understanding of the operation of the apparatus. FIG. 12 is a bar chart in which a complete cycle of sixty seconds is laid out for the important functions of the apparatus listed in the column on the left. In this sixty-second cycle, the array 96 will have been pushed one space to the right as viewed in FIG. 8.

The functions which are discussed and illustrated in the bar chart of FIG. 12 are numbered on the left. The No. 1 fuction which is performed is the movement of the sprocket chains 104. Since this movement is one which must be synchronized with all other functions of the apparatus, it is used to control the operation of the programmer 150. The programmer itself can comprise any of a wide variety of devices known. Cams and switches can be used, but it is preferred to use a rotating opaque disc interposed between a source of light and a plurality of photoresponsive devices, the timing being accomplished by means of transparent lines formed in the disc. The photoresponsive devices are connected to operate motors, solenoids, valves, etc.

The movement of the sprocket chains 104 occurs in two stages, these being marked A and B on the bar chart, occurring for somewhat less than ten seconds at the beginning of the cycle and for a like amount of time towards the end of the cycle. The solid bar represents energizing of the motor 110 which is connected to the programmer through the lines 174 and 176. The line 176 is interrupted twice for each cycle by means of a cam 178 and cam switch 180. The motor drives the sprocket 182 through the sprocket chain 184 to rotate the shaft 108. Simultaneously, with the movement of the chains 104, the sprocket chain 186 is driven, this latter chain having pins 188 which engage in notches 190 (FIG. 10) provided on the carriers 20 enabling the synchronized movement of the carriers 20 with the array 96. The chain 186 circulates at a considerably slower rate than the chains 104 to enable proper synchronization, the movement being geared down by a suitable speed change device as indicated at 192.

During the period A of movement of the chains 104, the beam 94 at the rear end of the bath 64 is lifted up to move the reaction tubes carried by the beam onto the cannulas 86 to dry the tubes while the beam 94 at the front of the bath in reading position is raised onto the probes 68 of the colorimeters 70. During the period B of the movement of the chains, the raised beams in both cases are lowered, the one at the rear being placed upon the rails 92 at the rear end of the bath 64 and the one at the front being lowered from the probes of the colorimeters to a position spaced forward of the bath 64.

The above-described movement of beams should be considered in connection with the movement of the pneumatic ram 100 as programmed in function No. 8 of the bar chart FIG. 12. This ram is connected by the line 194 to the valve V7 controlled by the programmer 150 through the line 196. The valve V7 is connected to a source of vacuum 198 for most of the cycle and is connected to a source of pressure 200 for a few seconds just before the completion of the movement B of the chains. Thus, just after the front and rear raised beams are lowered, the ram 100 is driven forward and pushes the entire array 96 forward one space leaving the next space at the rear for the next beam and pushing the array to fill the space left by the beam which has just had all of its sample dilutions tested.

In the practical device, the programmer 150 operated the pneumatic ram 100 and the ram or cylinder 128 simultaneously, but pushing one forward and the other backward. It will be recalled that the ram 128 was connected to the crossarm 122 and after the movement of the chains 104 had carried a beam over the upper arc of the sprockets 106–3, this crossarm 122 followed forward slightly. After the beam has been moved downwardly from this position so that the guide rods 134 were withdrawn from the guide holes 132 it was necessary to move the crossarm 122 backwards slightly to enable it to be aligned with the reaction tubes of the next rising beam. This is accomplished by the ram or cylinder 128 at the same time that the ram 100 is driven forward. The cylinder 128 connects by the line 202 through the valve V8 with a source of pressure 204. The program line is shown at 207, and as stated, this is illustrated only for explanation since the same system used for operating the ram 100 can be used for operating the cylinder or ram 128.

The function which is designated No. 2 is test cuvette pressure or vacuum. The colorimeters 70 comprise several parts which are diagrammatically illustrated in FIG. 2. There is a cuvette 206 through which a beam of light is directed from a light source 208 passing through a suitable colored filter 210 so that light of a particular wave length will pass through the solution in the cuvette 206 and impinge against the photoresponsive device 212. The electrical output from the photoresponsive device is transmitted by the line 76 to the computer 32 by way of a multiplexer 214 where suitable terminals providing the information can be scanned to pass the electrical results in proper order to the computer and related to the address of the sample serum from which the dilutions were made. There are as many colorimeters with a duplication of the elements enumerated as there are tests to be made.

It is understood that the information from the colorimeters must be suitably processed to be used, and the invention is not limited to any particular arrangement. In one arrangement, each photoresponsive device output is amplified, fed to the multiplexer from which it is drawn by scanning in proper sequence with respect to the channel or test order, the analog information converted to digital and the computations made to change the data into proper units before readout or stored or transmitted to another location for analysis.

The cuvette 206 of any colorimeter 70 has to perform several functions. Its principal function is to suck the solution out of a reaction tube into its body, read the absorbance and then expel the solution. The procedue is started when the chains have raised the beam so that the probe 68 of the cuvette 206 has commenced to enter the solution in the reaction tube 62. Note that the cuvette 206 is connected by a conduit 144 to a valve V9 that enables the cuvette to be connected to a source of vacuum 218 or a source of pressure 220, the valve V9 being programmed by way of the line 222. The cuvette 206 is connected to the pressure source 220 for a time several seconds after the beam has been raised and hence after the probe 68 has entered the sample dilution in the reaction tube 62. Thus, bubbles are passed into the solution, mixing it thoroughly. Then at about 13 seconds, the valve V9 is operated to aspirate the sample solution into the cuvette and hold it there. Since the beam of light must pass fully through the solution, the cuvette is required to be filled and held in that condition, hence the vacuum persists until the absorbance is ready to be read. This occurs starting at 40 seconds, and is indicated by the function No. 14. After the absorbance has been read by the apparatus, substantially simultaneously with the operation of section B of the chain movement, pressure is again applied to the cuvette 206 expelling the solution from it. The pressure is held for a considerable time in order to drive as much of the solution out the cuvette as possible to avoid contamination from sample to sample.

Function No. 3 depicted on the chart of FIG. 12 is designated movement of sample head arm down. The sample head 42 has been referred to herein as a sample aspirating and diluting head. The purpose of the head 42 is to accomplish several functions. In the first place, the head is normally poised in a position where its snorkel or probe 52 is out of the way of the movement of the carriers 20 and cups 22 past the same, so that when operated it is required to be moved in such a manner as to lower the probe into a sample cup. In the second place, after having been lowered into a sample, the head is required to draw the sample into a loop which will retain the same and measure out a specific amount. This is done after the head is raised. In the course of lowering and raising, at least two parts of the head 42 move with respect to one another, isolating the sample and thereafter mixing it with a specific quantity of reagent. The mechanism for accomplishing this need not be detailed herein, since several structures for accomplishing this can be utilized, including those which disclosed in patents above referred to. The mechanism for raising and lowering the head and at the same time moving the parts with respect to one another comprises a cylinder connected to the head in such a way as to give two movements with respect to one another through one rectilinear movement of the cylinder. Accordingly, it is only required to drive the cylinder to extend its plunger on one stroke and withdraw its plunger on the opposite stroke. The third movement must once more raise the probe out of the cup 22.

The cylinder referred to is designated 224 and each head has such a cylinder. Each cylinder is connected to a valve such as shown at V1, V2, V3, V4 and V5 as explained in connection with FIG. 11. The two parts of the head are shown as blocks 226 and 228 and these move relative to one another to produce the desired functions. When lowered, the probe 52 commences to suck sample serum as indicated by function No. 4, starting at about 8 or 9 seconds. This enters the loop 230 where it can be sheared off and trapped as a specific volume.

The sucking is accomplished by means of a line 232 leading to a diaphragm pump 234 that sucks in a certain amount and then maintains the suction without drawing more sample in. There are, of course, a plurality of such diaphragm pumps, all connected to a manifold 236 which in turn is connected to a valve V10. Valve V10 connects either to a source of vacuum or a source of pressure. Conveniently, any one of the vacuum and pressure sources may be used, through lines 238 and 240. Valve V10 is controlled from the programmer 150 by way of the line 242.

At about the same time that the serum sample is being drawn into the loop 230, the reagent receptacle 244 is connected by way of the line 246 through the movable parts of the head 42 to the line 248 leading to the reagent pump 250. Valve V11 connects the source of vacuum 252 in line 254 with manifold 256 through the control of the programmer by way of the line 258. This is shown in function No. 7.

When the reagent pump 250 is filled to the volume for which it is adjusted, means being provided to adjust the capacity of the cylinders of such pumps as indicated at 260, the arm of the sample head 42 is moved up, as indicated by the bar of function No. 5. This movement charges the connections in the moving parts 226 and 228 Commencing at about the time 18 seconds, as indicated by function No. 6, the reagent pump 250 is connected through the valve V11 to the source of pressure 262. Reagent is now pumped into the head 42 passing into a suitable internal passageway connecting with the loop 230 and the both liquids comprising reagent and sample are mixed and pumped into the line 58 and thence to the nozzle 60 and into a specific reaction tube of the beam aligned with the particular station.

Function No. 9 is designated front ram return. From the bar associated with this function in the chart, it is seen that pressure is applied for a period of time at the beginning of the cycle for a few seconds and before the commencement of the section A of the movement of the chains 104. The particular ram involved is the element 140 referred to previously as a cylinder. The plunger of this cylinder is connected to the crossarm 138 which carries all of the colorimeters 70. Recall that after a beam 94 has been raised along the reach 104–5 and has had the solutions of its reaction tubes measured by the colorimeters, the beam follows over the arcuate top of the sprockets 106–6 and ends up forward of the wall 66 when the beam is lowered. It is essential that the crossarm be returned rearwardly a small distance to align the probes 68 with the reaction tubes of the next beam that is raised. This is done by the ram or cylinder 140 during the time which is shown by function No. 9 of the bar chart FIG. 12. In FIG. 2, this cylinder 140 is shown connected by the conduit 264 to the valve V12 which provides an arrangement for the line 264 to be connected either to a source of pressure 266 or to the atmosphere or vent 268. Operation is controlled by the programmer 150 through the line 270 operating the valve V12. When not subjected to pressure, the cylinder 140 is vented and hence free to follow the movement of the beam over the upper arc of the sprockets 106–6 on the guide means 139.

Function No. 10 is the washing of the reaction tubes. The manifold 80 connects by the conduit 272 to the valve V13 controlled by the programmer 150 through the line 274 to supply water from a source 276. This occurs as noted for the period of time commencing at about 46 seconds to the end of the cycle, and preferably directs pulsed jets into the reaction tubes when they are disposed as shown in position 62–3. The waste receptacle 90 captures all washing fluids, waste dumpings of reagents, etc. A suitable pump 278 is operated at about the same period of time as the washing function No. 9 to empty the receptacle 90. This is shown in FIG. 12 as function No. 10. No diagrammatic connections and valves are shown in the drawings.

The functions No. 12 and 13 shown on the bar chart show pressure filling for drying from about 47 seconds to the end of the cycle, starting just at about the time the chains have stopped moving for section B of function No. 1; and they show drying the reaction tubes for the first ten seconds of the cycle which includes all of the period of time that the chains 104 are moving during section A of function No. 1. The section B movement of the chains has brought a beam with its reaction tubes up from below the bath 64 to the start of the reach 104–2. These tubes have been washed and emptied of wash water but are still damp. It is essential that they are dried thoroughly.

At this time the cannulas 86 of the crossarm 122 are aligned with the mouths of the reaction tubes, and the cannula are connected by the lines 130 to a manifold 282. The manifold 282 is connected to a vacuum source 284 controlled by the programmer 150 through the line 286 and to a valve V14 controlled by the programmer through a line 288 for connecting the valve V14 to a source of water 290. During the period designated function No. 12, the vacuum is off, the valve V14 connected to the source of water 290 and water is directed into all of the reaction tubes by the cannulas 86. After the reaction tubes are filled, the water is shutoff at the end of the cycle. When the new cycle begins, the water is shutoff and the manifold 282 connected to the source of vacuum 284. All of the cannulas are now sucking air, but since the beam will be raised during section A of function No. 1, the reaction tubes are raised onto the cannulas. Accordingly, the cannulas 86 suck at the surface of the water in each reaction tube, drawing the same in as the reaction tubes rise. The meniscus of each reaction tube is thus being constantly removed, as a result of which the tubes are thoroughly dried. This latter function is designated No. 13 in the chart.

Function No. 15 is designated end of cycle disable. This is not embodied in any apparatus shown in the drawings, but could be any kind of internal electrical signal needed to turn apparatus off or restart the same. Actually, the cycle is intended to continue repeating itself over and over again for best operation. It could be arranged with some kind of counting device to automatically turn the entire apparatus off in case a predetermined number of cycles occur without any readings being sensed by the computer.

The only component of FIG. 2 which has not been mentioned is the vacuum scavenge pump 292 connected to all of the heads by the conduits 294 for assisting in the operation of the head. This pump may be operated continuously so long as the programmer 150 is operating, being connected to the programmer by the line 296.

Considerable variation in the construction and operation of the apparatus detailed is feasible without departing from the spirit or scope of the invention as defined in the appended claims. The operation of the apparatus may be coupled or synchronized with the operation of a particle analysis device of the Coulter type or could be partially utilized for making other tests. In the latter respect, for example, one or more of the heads 42 could discharge the diluted serum sample into the sample testing receptacles of a flame photometer whose test results could then be transmitted to the computer and correlated to the results obtained from the operation of the colorimeters 70. Other variations will occur to those skilled in this art.

What it is desired to secure by Letters Patent of the United States is:

1. Apparatus for making a plurality of chemical tests on a plurality of test samples, comprising
   (A) an array of elongate racks arranged edge to edge, each rack having a plurality of reaction tubes therein forming rows of reaction tubes along the length of the array perpendicular to the racks thereof,
   (B) an incubating bath beneath the array and having all of the reaction tubes dipping into the bath,
   (C) means for moving the array forward along the bath perpendicular to the racks in a continuous step-by-step movement, each step being the width of a rack and including means for removing a rack from the front of the array before each step and depositing a rack on the rear of the array after each step,
   (D) means carrying a plurality of sample cups parallel with the direction of movement of the array with a different sample in each cup and synchronized with the step-by-step movement so that each cup is always spatially related to a single rack as the rack moves through the array.
   (E) a plurality of sample aspirating stations along the line of movement of the cups and each having means adapted to aspirate a sample from the cup which is disposed at its station during movement of the cups, dilute said sample with reagent, and deposit the mixed sample in one of the reaction tubes of the rack aligned with the cup, each aspirating station adapted to start a test different from all others started by the other aspirating stations and depositing its mixed sample in one of the reaction tubes of a particular row to the exclusion of mixed samples from all other stations,
   (F) means for testing each of the mixed samples in the reaction tubes of each rack after the rack is lifted off the front of the array and acquiring test data therefrom, and
   (G) means for thereafter emptying, washing and drying the reaction tubes of each rack and returning the rack to the rear of the array.

2. The apparatus as claimed in claim 1 in which the return speed is substantially greater than the forward speed of movement of a rack passing through the array whereby the array contains a substantially greater number of racks at any time than there is being returned from front to rear thereof.

3. The apparatus as claimed in claim 1 in which there are rails disposed alongside of the bath and the racks have groove means on their undersides adapted to engage with the rails whereby to be supported thereby and guided in sliding movement as the racks move through the array.

4. The apparatus as claimed in claim 2 in which there are rails disposed alongside of the bath and the racks have groove means on their undersides adapted to engage with the rails whereby to be supported thereby and guided in sliding movement as the racks move through the array.

5. The apparatus as claimed in claim 1 in which the means for moving the array and the racks comprise flexible conveyor means and a pusher, the pusher being disposed to the rear of the array and operated to push the entire array forward after a rack has been removed from the front of the array, and the conveyor means being arranged to execute a loop alongside of the bath from rear to front and thereafter to move in a path carrying the same around below the bath from the front to the rear thereof, means being provided to couple the front rack of the array to the conveyor means at the front of the bath whereby to lift said rack and remove its reaction tubes out of the bath and to uncouple each rack being carried by said conveyor means at the rear of the bath after depositing its reaction tubes in the bath and causing the rack to become the rear rack of the array, the portion of the loop of the conveyor means moving alongside of the bath from rear to front carrying no racks.

6. The apparatus as claimed in claim 2 in which the means for moving the array and the racks comprise flexible conveyor means and a pusher, the pusher being disposed at the rear of the array and operated to push the entire array forward after a rack has been removed from the front of the array, and the conveyor means being arranged to execute a loop alongside of the bath from rear to front and thereafter to move in a path carrying the same around below the bath from the front to the rear thereof, means being provided to couple the front rack of the array to the conveyor means at the front of the bath whereby to lift said rack and remove its reaction tubes out of the bath and to uncouple each rack being carried by said conveyor means at the rear of the bath after depositing its reaction tubes in the bath and causing the rack to become the rear rack of the array, the portion of the loop of the conveyor means moving alongside of the bath from rear to front carrying no racks.

7. The apparatus as claimed in claim 6 in which the conveyor means comprise a pair of chain members spaced apart and in which the means for coupling and uncoupling comprise inwardly extending pins spaced along the length of the chains and disposed as opposite inwardly extending pairs on the respective chains, a downwardly opening groove on the end of each rack and each groove having a laterally enclosed journal aligned therewith and spaced from the respective ends, guiding means for the chains positioned at the front of the bath for leading the portion of the loop moving alongside of the bath to converge while moving upwardly past the front rack whereby to cause the pins first to engage the grooves of the front rack and thereafter to engage the journals thereof, and guiding means for the chains positioned at the rear of the bath for leading the portion of the loop coming from below the bath and carrying racks to move downwardly toward the array and to diverge whereby to withdraw the pins from the rack being carried thereat and leave the said rack with the array.

8. The apparatus as claimed in claim 1 in which the testing means comprise a plurality of colorimeters each including a cuvette with means for drawing into said cuvette a mixed sample from each reaction tube of a rack and thereafter expelling the same, said rack removed from the front of the array adapted to be moved to bring each of its reaction tubes into operative relationship with said means for drawing a mixed sample, said colorimeters adapted to measure the absorbance of the respective mixed samples drawn into their respective cuvettes.

9. The apparatus as claimed in claim 8 in which the means for drawing a mixed sample comprises a probe and the colorimeters are arranged in spaced alignment with the reaction tubes of the rack removed from the front of the array, the means for removing said rack from the front of the array including structure for carrying said rack in an upwardly direction which withdraws the reaction tubes of the rack from said bath in alignment with said colorimeters whereby the probes of the colorimeters will respectively enter the reaction tubes, after which the rack moves forwardly of the bath, carrying the colorimeters therewith, said moving and depositing means thereafter lowering the rack spaced forwardly of the bath and dropping its reaction tubes away from said probes.

10. The apparatus as claimed in claim 9 in which means are provided for independently moving the colorimeters from forwardly of the bath back to a position over the bath and in alignment with the rack pushed into the front space of the array.

11. The apparatus as claimed in claim 6 in which the emptying and washing means comprise structure adjacent the conveyor means and located at the portion of the loop at the front thereof arranged to tip all of the reaction tubes of a rack being carried by the conveyor means to a disposition pouring their contents out, to retain the tubes tipped for a period of movement of the conveyor means, and including a manifold connected to a source of water under pressure and having jets directed at the mouths of the tubes, the conveyor means movement thereafter erecting the tubes while passing along the path below the bath.

12. In an automatic chemistry analysis apparatus in which a plurality of reaction tubes are to be dipped into a bath, incubated in the bath for a predetermined time, and thereafter removed from the bath, a conveyor system and bath combination comprising:

(A) an elongate incubating bath,
(B) an array of substantially identical elongate beams arranged edge to edge, each beam having a plurality of reaction tubes therein forming rows of reaction tubes along the length of the array perpendicular to the beam thereof,
(C) means supporting the entire array over the bath with the reaction tubes dipped into the bath and said means and the beams having cooperating structure to confine movement of the beams of the array along the length of the bath,
(D) beam moving means arranged cyclically to remove a beam from the front of the array and to withdraw the reaction tubes of the same from the bath, to push the entire array forward by a distance substantially equal to the width of a beam and to add another beam to the rear of the array while inserting the reaction tubes of the latter beam in the bath, said beam moving means comprising a pair of chains and a pusher, each beam adapted to be connected at its ends between the pair of chains during movement from the front of the array to the rear thereof but adapted to be disconnected from the chains during its movement while in the array, the latter movement being provided by the pusher only, whereby the array remains at substantially the same complement of beams but the individual beams are continuously moving through the array from rear to front thereof and thereby incubating samples contained in the reaction tubes for the time that the samples are inserted therein to the end of movement thereof.

13. The apparatus as claimed in claim 12 in which the array is always horizontally arranged and means are provided for carrying each beam removed from the front of the array down below the bath and to the rear thereof and then upwardly before being added to the rear of the array, there being a substantially greater number of beams moving forwardly in the array than the number of beams in the process of traveling from the front of the array to the rear thereof under the bath.

14. The apparatus as claimed in claim 12 in which means are provided for inserting sample solutions for incubation into selective ones of the reaction tubes at different positions of the beams carrying the tubes whereby the time of incubation of a sample solution is dependent upon the position along the array of the beam carrying the same when the solution is inserted.

15. The apparatus as claimed in claim 13 in which means are provided for inserting sample solutions for incubation into selective ones of the reaction tubes at different positions of the beams carrying the tubes whereby the time of incubation of a sample solution is dependent upon the position along the array of the beam carrying the same when the solution is inserted.

16. The apparatus as claimed in claim 12 in which the chains and beams have cooperating structure to enable the connection and disconnection of said beams.

17. The apparatus as claimed in claim 16 in which the said cooperating structure comprises inwardly extending projections spaced along the chains and pockets on the beam ends for receiving the projections, the outward ends of the pockets being open to the bottom surface of the beams, means being provided for guiding the chains to cause the same to diverge when a beam is to be disconnected and to diverge when a beam is to be connected, the movement of the chains from the front of the array below the bath to the rear of the bath being accomplished with the chains carrying beams connected thereto.

18. The apparatus as claimed in claim 17 in which the supporting means comprise rails and each beam is provided with grooves on its bottom transverse of the beams adapted to engage with the rails when the beam is included in the array.

19. The apparatus as claimed in claim 12 in which the chains and beams have cooperating structure to enable the connection and disconnection of said beams.

20. The apparatus as claimed in claim 19 in which the said cooperating structure comprises inwardly extending projections spaced along the chains and pockets on the beam ends for receiving the projections, the outward ends of the pockets being open to the bottom surface of the beams, means being provided for guiding the chains to cause the same to diverge when a beam is to be disconnected and to diverge when a beam is to be connected, the movement of the chains from the front of the array below the bath to the rear of the bath being accomplished with the chains carrying beams connected thereto.

21. The apparatus as claimed in claim 20 in which the supporting means comprise rails and each beam is provided with grooves on its bottom transverse of the beams adapted to engage with the rails when the beam is included in the array.

22. The apparatus as claimed in claim 14 in which the sample solution inserting means are operated in synchronism with the beam moving means.

23. The apparatus as claimed in claim 22 in which the sample solution inserting means comprises a plurality of sample withdrawing and diluting devices, a source of reagent for each such devices, and a plurality of sample cups arranged to have samples therein and moved in synchronism with the beam moving means into operative relation with the withdrawing and diluting devices in a predetermined order.

24. In an automatic chemistry analysis apparatus in which a plurality of chemical tests are to be made on a plurality of mixed sample solutions, structure for continuously mixing the sample solutions and depositing the same in reaction tubes to be incubated and tested, comprising:
  (A) a plurality of elongate racks each having a plurality of reaction tubes disposed therein,
  (B) means for moving a group of the racks in a horizontal direction transverse of their length in steps,
  (C) a plurality of sample cups arranged to move one after the other in a path alongside of the group of racks in the same directions as the movement of said group of racks and in synchronism therewith whereby each cup has a rack of the group individual thereto which is in fixed spatial relation with said cup throughout the period of movement of the racks of the group,
  (D) a plurality of sample aspirating and diluting devices and including a source of reagent for each device and a mixed sample solution delivering nozzle, said devices being arranged in a specific order along the path of movement of the cups and having the delivery nozzle disposed to discharge into a reaction tube specifically located along the length of each rack which comes to rest under the nozzle, each device being arranged to deliver sample solution to a differently located reaction tube along the length of each rack,
  (E) means for operating the device when a cup and its rack are in position adjacent said device,
  (F) indicia associated with each individual cup identifying the same,
  (G) means for reading the indicia as the cup is in said path, and
  (H) means programmed to respond to said indicia to cause any device to operate when the device is in said position adjacent a cup which is to have its sample aspirated, mixed with reagent and deposited in a reaction tube.

25. The apparatus as claimed in claim 24 in which means are provided for making a physical measurement of the mixed sample solutions of all of the reaction tubes of a rack reaching a predetermined point along the length of movement of the racks of the group, means are provided to empty the reaction tubes thereafter, to wash them and to return the rack to the beginning of the group.

26. The apparatus as claimed in claim 25 in which the movement of the racks in the group is a step by step progression of the rearmost rack towards the front of the group and the nozzles are located over the group and fixed in position at different locations along the length of the group so that the time that a mixed sample solution is in a reaction tube before the measurement thereof is made is determined by the distance of the device providing the mixed sample is located from the front of the group.

27. In an automatic chemistry analysis apparatus in which a plurality of reaction tubes are to be dipped into a bath, incubated in the bath for a predetermined time, removed from the bath, the sample solutions thereof emptied therefrom, the tubes rinsed and emptied and the tubes thereafter to be dried, means for drying the tubes comprising:
  (A) a support member having a plurality of cannulas depending therefrom,
  (B) a source of vacuum and a source of water, the source of vacuum being connected with the cannulas,
  (C) means carrying a plurality of reaction tubes in an arrangement with their mouths aligned with the cannulas,
  (D) means for connecting said source of water to fill said tubes with water,
  (E) means for connecting the cannulas with the source of vacuum to cause the same to apply suction at the open ends of the cannulas,
  (F) means for moving the reaction tubes and support member relative to one another in a vertical movement whereby to cause the cannulas to enter the reaction tubes and withdraw therefrom, and
  (G) means controlling the operation of the apparatus first to fill the reaction tubes with water while the tubes are spaced from the support member, then to connect the source of vacuum to said cannulas and move the support member relative to the reaction tubes to cause the water in the tubes to be sucked out and thereafter to withdraw the cannulas from the reaction tubes.

28. The apparatus as claimed in claim 27 in which the cannulas are also connected to the source of water and the means for connecting the source of water to the cannulas and the means for connecting the source of vacuum to the cannulas operate mutually exclusively.

29. Apparatus for making a plurality of chemical tests on a plurality of test samples, comprising:
  (A) means for carrying a plurality of different test samples in consecutive sample cups and means for moving said carrying means along a rectilinear path from the start end of the path to the finish end thereof in equal steps continuously,
  (B) a plurality of elongate racks, each rack having a plurality of reaction tubes mounted thereon and spaced along the length of the rack, there being one such rack individual to each sample cup,
  (C) an elongate incubating bath,
  (D) means forming an array of said racks arranged parallel one to the other and touching side by side within said array and means for supporting and guiding the racks of the array to enable them to move from the rear end of bath to the front end of the bath with the reaction tubes of each rack dipped in the bath during such movement,
  (E) means for moving the racks of the array sideways in equal steps continuously in a direction that is parallel with said rectilinear path and the rack moving means being synchronized with the means for moving the carrying means whereby each sample cup will have a substantially continuous spatial relationship with the rack individual thereto throughout the extent of movement of the rack and sample cup while said sample cup is in said path,
  (F) the reaction tubes of each rack being identically spaced along the length of its rack whereby all similarly located reaction tubes will form a row of tubes considered along the array parallel to the direction of movement thereof,
  (G) a plurality of sample aspirating stations arranged along the rectilinear path in a spacing which provides stations at predetermined distances from the finish end of the path, each station having a sample aspirating and diluting head with a probe, a source of reagent and means for metering the reagent and mixing the same with a predetermined volume of sample from a cup to start a test different from those to be started at every other station, there being at least as many heads as there are rows, the probe of each head adapted to be immersed in a particular sample cut at that station having said last-mentioned head and the metering and mixing means adapted to draw a sample in, mix the same and deposit the mixed solution in a particular reaction tube in one of the rows in the rack which is spatially related to the particular sample cup, said rack at the time being aligned with the station that is depositing mixed solution therein, (H) each station being arranged to deposit its mixed solution in the same row, but always in the rack aligned with the station, (I) a reading station at the front end of the array and having testing means for each row, with structure for subjecting the mixed samples of the reaction tubes of the front rack to individual tests and providing data therefrom, (J) the rack moving means including a pair of continuous flexible conveyor members moving in a loop and a pusher, the conveyor members having means for enabling racks to be coupled thereto or uncoupled therefrom and means for guiding the looped movement of the conveyor members, the guiding means including means for uncoupling a rack from the conveyor members at the rear end of the bath and means for coupling a rack to the conveyor members at the front end of the bath, (K) all of the racks of the array being free of the conveyor members while arranged for having the reaction tubes thereof receive the deposit of mixed samples, (L) the conveyor means, guiding means, coupling means and uncoupling means being arranged to couple the front rack of the array with the conveyor means to lift the same out of the bath and into testing relation with the testing means, thereafter to carry the rack downwardly and thence rearwardly under the bath to the rear of the bath, to raise the rack at that point and carry it over the rear end of the bath and thereafter to bring the rack down upon the supporting and guiding means and there uncouple the rack from said conveyor means, the conveyor means then continuing to move to the forward end of the bath without carrying any racks, (M) the coupling, uncoupling and conveying actions being carried out continuously and with consecutive racks, with the pusher being operated after a rack has been removed from the front end of the array to push the entire remaining array forward to fill the space left by the removal of the front rack and leave a space at the rear to be occupied by a newly deposited rack, (N) the apparatus including means for emptying, washing and drying the reaction tubes of the racks as they move from said testing relation to the rear of the array.

30. In an automatic chemical analysis apparatus which includes an array of beams each carrying a number of reaction tubes moving in an incubating bath in one direction, the reaction tubes arranged in rows and the beams moving sideways parallel to the rows, the combination of a series of sample cups, means to carry the cups in a row parallel to the rows of reaction tubes in the same direction and synchronized therewith, each cup being individual to one beam and maintaining a spatial relationship therewith throughout the movement, a plurality of sampling devices spaced along the length of movement of the cups and each capable of withdrawing sample from a cup, mixing it with reagent and depositing the mixed sample in the reaction tube of a particular row for a test different from all other tests, and means for enabling the operation of only selected ones of said sampling devices with respect to each cup which comes into sample withdrawing relationship with the respective sampling devices.

31. The apparatus as claimed in claim 30 in which the last means comprise a memory having instructions stored therein with respect to the address of each cup, each cup having address indicia, and means being provided to automatically read the indicia and advise the memory during the travel of the cups.

References Cited
UNITED STATES PATENTS

| | | | |
|---|---|---|---|
| 3,487,862 | 1/1970 | Soderblom | 23—259 X |
| 3,489,521 | 1/1970 | Buckle et al. | 23—259 X |
| 3,511,613 | 5/1970 | Jones | 23—292 X |
| 3,533,744 | 10/1970 | Unger | 23—259 X |
| 3,575,692 | 4/1971 | Gilford | 23—259 X |
| 3,578,412 | 5/1971 | Martin | 23—259 |
| 3,622,279 | 11/1971 | Moran | 23—259 |

MORRIS O. WOLK, Primary Examiner

R. E. SERWIN, Assistant Examiner

U.S. Cl. X.R.

23—259; 73—425.6; 141—130

UNITED STATES PATENT OFFICE
CERTIFICATE OF CORRECTION

Patent No. 3,799,744                    Dated March 26, 1974

Inventor(s) ALAN RICHARDSON JONES

It is certified that error appears in the above-identified patent and that said Letters Patent are hereby corrected as shown below:

Col. 10, line 48, change "9" to --92--. Col. 11, line 34, change "pisitions" to --positions--. Col. 12, line 17, change "leaves" to --leave--. Col. 13, line 46, insert --,-- after "thus". Col. 14, line 1, add --s-- to "move". Col. 15, line 33, change "fuction" to --function--. Col. 16, line 65, change "procedue" to --procedure--. Col. 18, line 6, insert --.-- after "228". Col. 21, line 70, claim 12B change "beam" to --beams--. Col. 23, line 33, claim 24C take "s" off "directions"

Signed and sealed this 11th day of March 1975.

(SEAL)
Attest:

RUTH C. MASON
Attesting Officer

C. MARSHALL DANN
Commissioner of Patents
and Trademarks